(12) United States Patent
Pecher et al.

(10) Patent No.: US 12,030,964 B2
(45) Date of Patent: Jul. 9, 2024

(54) BIAXIALLY-ORIENTED POLYETHYLENE FILMS FOR THERMOFORMING, PROCESS FOR THE PRODUCTION THEREOF, THEIR USE, A PROCESS FOR THERMOFORMING AND ITS PRODUCTS

(71) Applicant: BRÜCKNER MASCHINENBAU GmbH, Siegsdorf (DE)

(72) Inventors: Michael Pecher, Traunstein (DE); Andrei Douzhyk, Siegsdorf (DE); Ilja Müller, Schonstett (DE); Jan Barth, Siegsdorf (DE)

(73) Assignee: BRÜCKNER MASCHINENBAU GmbH, Siegsdorf (DE)

( * ) Notice: Subject to any disclaimer, the term of this patent is extended or adjusted under 35 U.S.C. 154(b) by 0 days.

(21) Appl. No.: 17/947,727

(22) Filed: Sep. 19, 2022

(65) Prior Publication Data
US 2023/0087287 A1 Mar. 23, 2023

(30) Foreign Application Priority Data
Sep. 20, 2021 (DE) .................. 10 2021 124 259.2

(51) Int. Cl.
*C08F 110/02* (2006.01)
*B29C 51/00* (2006.01)
*C08J 5/18* (2006.01)

(52) U.S. Cl.
CPC ........ *C08F 110/02* (2013.01); *C08F 2500/07* (2013.01)

(58) Field of Classification Search
CPC .... B29C 51/002; B29K 2023/06; C08F 10/02
USPC .................... 526/348.1; 264/210.7
See application file for complete search history.

(56) References Cited

U.S. PATENT DOCUMENTS

| 5,589,561 | A | * | 12/1996 | Barry | .................. C08L 23/0815 526/348.3 |
| 10,414,086 | B2 | * | 9/2019 | McLeod | .................. B29C 55/12 |
| 2008/0023875 | A1 | * | 1/2008 | Jammet | .................. B29C 48/21 264/165 |
| 2016/0020030 | A1 | | 1/2016 | Aotani et al. | |

FOREIGN PATENT DOCUMENTS

| DE | 10 2005 041 134 | 3/2007 |
| DE | 10 2019 112 089 | 11/2020 |
| EP | 1 876 010 | 1/2008 |
| EP | 1 395 415 | 12/2010 |
| EP | 2 109 535 | 4/2013 |
| EP | 3 152 128 | 4/2019 |

* cited by examiner

*Primary Examiner* — Fred M Teskin
(74) *Attorney, Agent, or Firm* — Nixon & Vanderhye P.C.

(57) ABSTRACT

A biaxially-oriented film for thermoforming is disclosed including at least 75% by weight polyethylene and at least 95% by weight polyolefins, based on the total mass of the film. The polyethylene has an elongation at break of at least 7 in the stress-strain diagram, wherein the stress-strain diagram is measured at a temperature of 10° C. below the melting point of the polyethylene and the melting point is determined by differential scanning calorimetry using a heating rate of 10° C. per minute. A process for producing such films and to the use thereof are disclosed. A process for producing shaped bodies from such films and to the shaped bodies themselves are disclosed.

18 Claims, 2 Drawing Sheets

BIAXIALLY-ORIENTED POLYETHYLENE FILMS FOR THERMOFORMING, PROCESS FOR THE PRODUCTION THEREOF, THEIR USE, A PROCESS FOR THERMOFORMING AND ITS PRODUCTS

CROSS RELATED APPLICATION

This application claims priority to German Patent Application DE 10 2021 124 259.2, filed Sep. 20, 2021, the entire contents of which is hereby incorporated by reference.

INTRODUCTION

The present invention relates to a biaxially-oriented film for thermoforming, characterised in that the film contains at least 75% by weight polyethylene and at least 95% by weight polyolefins, based on the total mass of the film. It further relates to a process for producing such films and to the use thereof. Moreover, the invention relates to a process for producing shaped bodies from such films and to the shaped bodies themselves.

PRIOR ART

Films made of biaxially-oriented plastic films and their properties are known to the person skilled in the art. In the production of such films, molten plastic granules are extruded and a cast film is produced therefrom. The cast film is then oriented by uniaxial or biaxial stretching. Stretching can take place in a sequential or in a simultaneous process. Examples of biaxially-oriented plastic films that are used in industry are films made of biaxially-oriented polypropylene (BOPP), films made of biaxially-oriented polyethylene terephthalate (BOPET), films made of biaxially-oriented polyamide (BOPA) and films made of biaxially-oriented polystyrene (BOPS). The biaxial orientation brings about a change in the morphology of the molecular structure which gives the films a plurality of different advantageous properties, while at the same time reducing the overall thickness:
 Change in the physical properties (e.g., improved rigidity and tear strength)
 Optical features (e.g., increased transparency and increased gloss)
 Barrier properties (e.g., improved barrier properties for oxygen (or air) and water)
 Savings on packaging weight/material-efficient packaging
 More energy-efficient production Stretching in the two stretching directions can be carried out separately (sequentially) or else in one process step (simultaneously). In sequential stretching, the stretching in a longitudinal direction (machine direction; "MD") and in a transverse direction (transverse to the machine direction; "TD") are performed separately in terms of time. In general, the stretching is first performed in a longitudinal direction and then in a transverse direction.

Blown film processes (e.g., a double bubble process) and flat film processes (BO/LISIM®/MESIM®) are known as processes for producing biaxially-oriented films. The different processes would accordingly be the simultaneous blown film process (double bubble) or the flat film process, which can be subdivided into simultaneous (LISIM®, MESIM®, etc.) and sequential processes.

Thermoforming is a primary polymer conversion process. In this, a film is heated until it is in a rubber-elastic state and deformed via, e.g., mechanical or pneumatic deformation (e.g., drawn using a vacuum), wherein the surface of the film is deformed to create a three-dimensional object. Big advantages of this technique are energy and production efficiency, inexpensive thermoforming tools and machines, and the possibility of forming multilayer films, cavities and pre-printed films.

Usually, amorphous and partially crystalline polymers such as polyvinyl chloride (PVC), cast polypropylene (cast PP or CPP), cast polyethylene terephthalate (cast PET), polystyrene (PS), biaxially-oriented polystyrene (BOPS), ethylene vinyl alcohol copolymer (EVOH), acrylonitrile-butadiene-styrene copolymer (ABS), etc., are deformed in this process. Multilayer films which contain layers made of polyethylene (PE) can also be used, for example co-extruded multilayer blown films having a PS-EVOH-PE or PP-EVOH-PE three-layer structure. Depending on the combination, the polyethylene layers can be used here, for example, to introduce better heat-sealing properties or better barrier properties into a product at low cost.

The problem with thermoplastics such as polyethylene and polypropylene, for example, is that the orientation causes a reduction in the elongation at break. This is problematic in the thermoforming process. Because of this, few biaxially-oriented films are suitable for the thermoforming process. This includes BOPS and, to a certain extent, also biaxially-oriented polypropylene (BOPP). One advantage of oriented polymers in terms of thermoformability is that due to the stretching, the film does not tend to sag when heated. Film sagging leads to irregular deformation of the thermoformed product. Film sagging is due to the linear thermal expansion of the raw material which proves to be problematic, for example, in film types such as cast polypropylene film. This effect is not observed in biaxially-oriented polystyrene.

Depending on the raw material, polyethylene as a cast film has very low modulus of elasticity values and very high shrinkage (and thus low dimensional stability) compared to cast films made from other polymers. Therefore, the use of cast polyethylene films in thermoforming processes is restricted to special fields of use. This includes, for example, thermoforming with talc for consolidation in the case of large mudguards. Thus, polyethylene only occupies a very small market share in the thermoforming market. This is contrary to the market share in the entire packaging market, which accounts for more than 50%.

One problem when thermoforming polyethylene is the irregular thinning of the film in its peripheral regions that occurs during forming in the case of more complex shapes due to the non-uniform shrinkage behaviour and the lower dimensional stability. If a film is thermoformed which is too thin, the amount of material remaining at the edges is insufficient to strengthen the edges. A further problem is bending under load, which can occur in the thermoforming process and can lead to plastic deformation or material damage. The positive properties of polyethylene include, among others, the price of the raw material, availability, impact strength, chemical resistance to many acids and alkalis, etc. In practice, to date, it has not been possible to produce oriented polyethylene films of sufficient quality to be used in thermoforming.

One big disadvantage of virtually all thermoforming products is that they are not included in the established recycling streams. In particular, current products that use biaxially-oriented films with polystyrene or polypropylene copolymers (e.g., for low-temperature applications) are not included in the recycling streams. Since consumers and legislators worldwide are becoming increasingly critical of plastic waste and the disposal thereof is costly, this represents a growing problem.

Alongside packaging (foodstuffs, medicine), examples of thermoformed parts made from different polymers are applications in the industrial sector (hoods, cladding for machines and plant construction, commercial vehicle construction, fittings), in the consumer goods sector for manufacturing refrigerators. Biaxially-oriented polystyrene is used in thermoforming to achieve a high degree of rigidity combined with high transparency. It is frequently used in packaging in which it is desired that the packed product be clearly visible.

A multilayer thermoplastic film is known from EP 3 152 128 B1 which comprises at least five layers, of which two interior layers each contain a high-density polyethylene (HDPE). In one embodiment, these two interior layers make up at least 35% of the total thickness of the multilayer thermoplastic film. Example 1 describes a film, the thickness of the HDPE layers of which makes up about two thirds of the film thickness. The multilayer thermoplastic film according to Example 1 is produced by a single-bubble blown film process. The films are used for the production of blister packs by thermoforming.

US 2016/020030 A1 discloses a process for producing a multilayer biaxially-oriented film. The film is produced in a triple-bubble blown film process. The film contains no more that 30% polyolefin, which includes LDPE and LLDPE.

The published patent application DE 10 2005 041 134 A1 discloses a three-layer film which has a printable, thin film, an adhesive layer and a thermoformed film (can be used for the thermoforming). The thin film can be biaxially oriented. It can also contain HDPE. The thermoformed film can likewise contain polyethylene. However, it is not disclosed that the thermoformed film can be biaxially oriented.

Patent specification EP 1 395 415 B1 discloses a biaxially-oriented film comprising up to 15 wt. % polyethylene. The published patent application EP 1 876 010 A1 discloses biaxially-oriented polypropylene films for thermoforming which can contain foamed polymers, such as polyethylene for example.

OBJECT OF THE INVENTION

The object of the present invention was to provide a thermoformable film which as far as possible is of single origin and therefore suitable for recycling. Further, it should be possible to produce the film as inexpensively as possible and it should preferably be less expensive than conventional thermoforming films.

A further aim is to provide a film that has the most favourable barrier properties to oxygen, air and water. Preferably, the modulus of elasticity of the films should be as high as possible. The shapes produced therefrom should preferably have the greatest possible dimensional stability. A further object of the present invention is to produce a film that can be thermoformed in a uniform manner and has a good balance of mechanical properties after thermoforming. The present invention furthermore has the object of providing polyethylene films in a form that is suitable for thermoforming. It was additionally the object of the present invention to make weight-efficient packaging possible. More energy-efficient production of packaging is also an aim.

A further object of the present invention is to produce a film that can be thermoformed in a uniform manner and that, following thermoforming, yields shaped bodies which have a good balance of mechanical properties.

DESCRIPTION OF THE INVENTION

BOPE Films

The present invention relates to a biaxially-oriented film for thermoforming, characterised in that the film contains at least 75% by weight polyethylene and at least 95% by weight polyolefins, based on the total mass of the film. The films according to the invention can be successfully subjected to thermoforming.

Effects

The physical properties of the films are improved by biaxially orienting the films according to the invention. Rigidity, tear strength and modulus of elasticity increase. Depending on the stretch ratio, the modulus of elasticity can be increased to twice its size or more by stretching. The density decreases as a result of the stretching. Mouldings produced from the films according to the invention have better resistance and better tear strength at the same thickness than shaped bodies produced from the same non-oriented cast polyethylene films, at least to the extent that any shaped bodies can actually be produced from the non-oriented cast polyethylene films. The shaped bodies can therefore be produced using less material and have a sufficiently high rigidity. The above-mentioned changes to the physical properties are advantageous in thermoforming.

Furthermore, the shaped bodies produced from the film according to the invention by means of the process according to the invention have a higher puncture resistance. Overall, biaxial stretching also leads to more homogeneous properties in the longitudinal and transverse direction of the film and thus also to more homogeneous properties of the shaped bodies produced from it. This is especially true in comparison with a uniaxially stretched film. The thickness distribution is also distinctly better than in non-oriented or uniaxially oriented films. The same effect also results in better processability of the films.

The optical features of the film are also improved. Stretching causes transparency and gloss to increase, and haze to decrease. The film according to the invention is therefore particularly well suited to packaging and the like, where the contents should be clearly visible. The barrier properties to oxygen and air are improved by the stretching. Furthermore, using the films according to the invention for thermoforming allows weight savings to be made in the products. For example, the result is a more weight-efficient packaging, because the same amount of film material after stretching provides a larger film surface area for the packaging. Moreover, the film according to the invention leads to a more energy-efficient production, since significantly better properties are obtained, with the stretching only requiring a low expenditure of energy. Compared to biaxially oriented films made from polypropylene or polystyrene, which are likewise suitable for thermoforming, the films according to the invention furthermore have all of the advantages afforded by the use of polyethylene, such as a low raw material price, good availability, impact strength, good chemical resistance to acids and bases, and so on.

A further advantage of the films according to the invention is that they do not tend to sag due to the stretching of the film during heating in the thermoforming process.

All of the percentages by weight specified in this invention are based in each case on the total mass of the film, unless specified otherwise. During the thermoforming process, the film is deformed and therefore, like during stretching, a sort of stretching of the film occurs, but it is irregular. To better distinguish between the stretching during stretching of the film and the stretching during thermoforming, the following nomenclature is used: With reference to stretching during the production of the film, one of the verbs "to stretch" or "to orient" is used, which mean the same thing for the purposes of the present invention. With reference to the forming or stretching during thermoforming, the verb "deform" (in particular also appears as "formed" and the like) is used.

The high content of polyethylene in the films used in the present process ensures that the shaped bodies can be fed to the recycling stream for polyethylene. This is a significant advantage of the high polyethylene content. In this way, the film waste, which arises during the production of the film or shaped body, can be disposed of cheaply, namely through recycling. Expensive waste disposal is no longer necessary. Furthermore, the shaped bodies produced from the films according to the invention are not subject to the restrictions for non-recyclable plastics goods, which makes them distinctly more commercially viable. Acceptance by consumers is also distinctly increased as a result.

Composition

The films according to the invention can consist entirely of polyethylene, that is contain 100% by weight polyethylene. However, the films must contain at least 75% by weight polyethylene. If a polyethylene film that contains less than 95% by weight polyethylene is used in the process according to the invention, the film has to contain at least enough other polyolefins so that the sum of the mass fraction of all polyolefins including the polyethylene amounts to at least 95% by weight. It should be emphasised here, merely for clarity, that in the context of the present application, polyethylene is likewise a polyolefin. Preference is given to films according to the invention which contain at least 85% by weight polyethylene, and particular preference to those which contain at least 90% by weight polyethylene. Most preference is given to films according to the invention which contain at least 95% by weight polyethylene. All of the films according to the invention correspond to the stipulations for most polyethylene recycling streams.

The term polyethylene in this case includes homopolymers as well as copolymers, which, in addition to ethylene, as monomers can contain up to 6% by weight and preferably no more than 5% by weight of other olefins as comonomers. Very particularly preferably, the other olefins are present in the copolymers in an amount of up to 3% by weight and most preferably in an amount in the range from 0.1 to 3% by weight. These quantities are based in each case on the total mass of the copolymer. These olefins are preferably C3 to C20 olefins. They are also preferably alpha-olefins. Particular preference is given to C3 to C20 alpha-olefins. The alpha-olefins are in turn preferably chosen from the group consisting of propene, 1-butenes, 1-pentenes, 4-methyl-1-pentene, 1-hexene, 1-octene and 1-decene and particularly preferably chosen from the group consisting of propene, 1-butene, 1-hexene and 1-octene. Cyclic olefins can be named as examples of further comonomers. The comonomers can also be olefins which contain functional groups. Such olefins can be chosen from the group consisting of dienes, aromatic olefins, olefins containing carboxylic acid groups, olefins containing ester groups and olefins containing cyanide groups. Butadiene, for example, could be mentioned as a diene. One example of a suitable aromatic olefin is styrene. Acrylic acid and its esters, methacrylic acid and its esters, and maleic acid can be mentioned as examples of olefins containing carboxylic acid groups and olefins containing ester groups, with maleic acid being preferred. Monomers containing heteroatoms other than oxygen atoms are, however, not preferred.

In terms of the polyethylene content of the films used in the process according to the invention, the copolymers of the polyethylene described herein are fully included in the calculation of the polyethylene content. Thus for example, for the purposes of this application, a polyethylene film containing 75% by weight of a polyethylene copolymer and no further polymers containing ethylene monomers is considered to be a polyethylene film containing 75% by weight polyethylene.

Mixtures containing a plurality of different polyethylene homopolymers or mixtures composed of a plurality of different polyethylene copolymers can also be used. Mixtures of one or more polyethylene homopolymers with one or more polyethylene copolymers can also be used.

Preference is given to films according to the invention which are characterised in that they contain a polyethylene chosen from the group consisting of high-density polyethylene (HDPE), medium-density polyethylene (MDPE) and linear low-density poly-ethylene (LLDPE), and mixtures thereof. The films according to the invention particularly preferably contain a polyethylene chosen from the group consisting of high-density polyethylene (HDPE) and linear low-density polyethylene (LLDPE), and mixtures thereof. The films according to the invention very particularly preferably contain high-density polyethylene (HDPE). The films according to the invention particularly preferably contain exclusively the aforementioned polyethylenes.

If, in addition to polyethylene, the film according to the invention contains other polyolefins, these can be any desired polyolefins. They are preferably polyolefins containing alpha-olefins as monomers. They preferably contain exclusively alpha-olefins as monomers. The polyolefins are preferably chosen from the group consisting of polypropylene, polybutylene, polyhexene and polyoctene. Furthermore, the polyolefins can be, for example, a polyolefin chosen from the group consisting of polystyrene, polyacrylic acid, polymethacrylic acid and polyacrylic acid ester, polymethacrylic acid ester. The polyolefins which can be used in the films of the process according to the invention in addition to the polyethylene can be present in a mixture (blends) with the polyethylene(s) or can be used separately therefrom, for example in other layers. For example, they can be used as a separate layer in the polyethylene film.

Preference is also given to polyethylenes prepared by Ziegler-Natta polymerisation. Further preference is given to polyethylenes prepared by suspension polymerisation. Most preference is given to polyethylenes prepared by Ziegler-Natta polymerisation in suspension, namely in particular HDPE which is prepared with the aid of this method.

The biaxially-oriented film according to the invention is suitable for use in a thermoforming process. The orientation (also stretch or elongation) of the film improves its properties and thus makes it more suitable for thermoforming. Elongating films and thermoforming are similar processes. In the case of stretching, the films are heated until they are slightly deformable and are stretched lengthwise and/or widthwise, i.e. perpendicularly to the thickness. Due to the plastic properties of the film material, the shape of the films changes (length, width and height). The deformation is essentially regular over the entire film. In the case of thermoforming, the films are heated until they are slightly deformable and then deformed by a force acting perpendicularly on one of the surfaces, i.e. in the thickness direction. In this case too, the film material is stretched, but irregularly and not in the plane of the film surface. Some parts of the film are greatly deformed (stretched) in the process and others are only slightly deformed, or not at all. However, the stretchability (orientability) of polyethylenes is limited. This is a material property which can be taken from the stress-strain diagram of the respective polyethylene as elongation at break. So that the films according to the invention do not tear at their highly stretched points during the thermoforming, they should therefore have a high elongation at break. Since both the orientation and the thermoforming are performed just below the melting point of the polyethylenes, the elongation at break at such a temperature is relevant. A film according to the invention is therefore characterised in that the polyethylene has an elongation at break of at least 7 in the stress-strain diagram, wherein the stress-strain diagram is measured at a temperature of 10° C. below the melting point of the polyethylene and the melting point is determined by differential scanning calorimetry using a heating rate of 10° C. per minute. The elongation at break is particularly preferably at least 8 and very particularly preferably at least 9. In this case, the elongation at break is specified as a multiple of the original length of the sample. This is illustrated with the aid of FIG. 3. This shows the stress-strain diagrams of three different polyethylenes. As can be seen, the polyethylene of type C tears at a stretch ratio of about 3.7. Therefore, this film does not correspond to this feature. Polyethylenes A and B tear at a stretch ratio of about 10.7 and about 9. Both of these polyethylenes therefore have an elongation at break of 9 or more.

Investigations by the inventors have further shown that polyethylenes which are particularly suitable are those which, when the strain is increased, exhibit the smallest possible change in stress in the plastic region of the stress-strain diagram. Large changes in stress cause a variety of wall thicknesses to be formed when a force is applied during thermoforming, wherein very thin wall thicknesses can also arise, or even cracks when the stress changes are too great. It is therefore preferable for the stress-strain diagram of the polyethylene used to have an approximately straight linear form in the plastic region. This property can be found particularly in polyethylenes which are tough but flexible (see types A and B in FIG. 3). These have a yield point, beyond which the stress falls somewhat. Thereafter, these curves usually exhibit an approximately straight course, at least in part. Preference is therefore given to a film according to the invention which is characterised in that the stress-strain diagram of the polyethylene has an upper yield point and the yield stress is the highest stress in the stress-strain diagram, wherein the stress-strain diagram is measured as specified above. The yield stress is the stress at the yield point. This is also illustrated with the aid of FIG. 3. Type C has no yield point. Types A and B have a yield point. However, in the case of higher strain, type B has stresses that lie above the yield stress. This is not the case with type A, however, and this type is particularly suitable because its stress-strain diagram exhibits no stress lying above the yield stress.

It is furthermore particularly advantageous if the stress in the stress-strain diagram of the polyethylene does not increase, or only increases slightly, in the event of strain values which are higher than the strain at yield (strain at the yield point). If the stress increases at any point after the yield point, the curve forms a reversal point—the lower yield point—as shown in FIG. 3 for the type A and B polyethylenes. Such an increase is called stress-strain hardening. For this case, preference is given to a film according to the invention which is characterised in that the stress-strain diagram of the polyethylene additionally has a lower yield point and all stress values in the case of strain values higher than the strain at the lower yield point are lower than the mean value of the yield stress and the stress at the lower yield point.

Even more preference is given to a film according to the invention which is characterised in that the stress-strain diagram of the polyethylene has no stress-strain hardening at all. Such stress-strain diagrams have an upper yield point but no lower yield point. The stress does not increase therefore in the case of strain that is higher than the strain at yield.

Properties

Preference is given to films according to the invention which are characterised in that their modulus of elasticity is 800 MPa. The modulus of elasticity is particularly preferably at least 1000 MPa and very particularly preferably at least 1100 MPa. A high modulus of elasticity is of advantage for most thermoforming applications. Films having a high modulus of elasticity give the manufactured moulding not only high strength and rigidity but also high dimensional stability, which are important for producing and maintaining the desired shape of the shaped body.

The films according to the invention preferably have a heat shrinkage in the longitudinal direction of at most 5%, particularly preferably of at most 3% and very particularly preferably of at most 2%. The films according to the invention furthermore have a heat shrinkage in the transverse direction (TD) of at most 5%, particularly preferably of at most 3% and very particularly preferably of at most 2%. It is likewise preferred that the films according to the invention have a heat shrinkage in both the longitudinal direction and in the transverse direction of at most 5%, particularly preferably of at most 3% and very particularly preferably of at most 2%. The heat shrinkage is measured in each case according to BMS TT 0.9 at 100° C. for 5 min.

The films according to the invention preferably have a thickness in the range from 25 µm to 2000 µm. Particular preference is given to films according to the invention having a thickness in the range from 100 µm to 2000 µm. Very particular preference is given to films according to the invention having a thickness in the range from 100 µm to 1000 µm and most preferred are films having a thickness in the range from 150 µm to 500 µm. These film thicknesses are as determined according to DIN 53370. Thicker films can also be obtained by laminating biaxially-oriented thinner films. The thermoforming of films having such thicknesses results in shaped bodies that have thicknesses suitable for most industrial purposes. Further preferred is a film according to the invention which has a 2-sigma film thickness distribution value of 15% or less. The films according to the invention particularly preferably have a 2-sigma film thickness distribution value of 10% or less and very particularly preferably a 2-sigma film thickness distribution value of 7% or less. Most preference is given to films according to the invention having a 2-sigma film thickness distribution value of 5% or less.

The width of the films according to the invention is preferably in the range from 10 to 50 cm and particularly preferably in the range from 20 to 30 cm.

A further preferred subject of the present invention is a biaxially-oriented film for thermoforming which is characterised in that the film contains at least 75% by weight polyethylene and at least 95% by weight polyolefins, based on the total mass of the film, the polyethylene having an elongation at break of at least 8 in the stress-strain diagram, wherein the stress-strain diagram of the polyethylene has an upper yield point and the yield stress is the highest stress in the stress-strain diagram and wherein the film has a thickness in the range from 25 µm to 2000 µm, a 2-sigma thickness distribution value of 10% or less, a shrinkage in the longitudinal and transverse directions of at most 5% and wherein the stretch ratio in the longitudinal and in the transverse direction lies in the range from 1.2 to 5.5, the stress-strain diagram being measured at a temperature of 10° C. below the melting point of the polyethylene and the melting point being determined by differential scanning calorimetry using a heating rate of 10° C. per minute.

A further preferred subject of the present invention is a biaxially-oriented film for thermoforming which is characterised in that the film contains at least 80% by weight polyethylene and at least 95% by weight polyolefins, based on the total mass of the film, the polyethylene having an elongation at break of at least 8 in the stress-strain diagram, wherein either (1) the stress-strain diagram of the polyethylene has an upper and a lower yield point and all stress values in the case of strain values higher than the strain at the lower yield point are lower than the mean value of the yield stress and the stress at the lower yield point or (2) the stress-strain diagram of the polyethylene has an upper yield point and exhibits no strain hardening and wherein the film has a thickness in the range from 25 µm to 1000 µm, a 2-sigma thickness distribution value of 7% or less, a shrinkage in the longitudinal and transverse directions of at most 3% and wherein the stretch ratio in the longitudinal and in the transverse direction lies in the range from 1.2 to 5.0, the stress-strain diagram being measured at a temperature of 10° C. below the melting point of the polyethylene and the melting point being determined by differential scanning calorimetry using a heating rate of 10° C. per minute.

A further preferred subject of the present invention is a biaxially-oriented film for thermoforming which is characterised in that the film contains at least 80% by weight polyethylene and at least 95% by weight polyolefins, based on the total mass of the film, the polyethylene having an elongation at break of at least 9 in the stress-strain diagram, wherein either (1) the stress-strain diagram of the polyethylene has an upper and a lower yield point and all stress values in the case of higher strain values than the strain at the lower yield point are lower than the mean value of the yield stress and the stress at the lower yield point or (2) the stress-strain diagram of the polyethylene has an upper yield point and exhibits no strain hardening and wherein the film has a thickness in the range from 150 µm to 500 µm, a 2-sigma thickness distribution value of 5% or less, a shrinkage in the longitudinal and transverse directions of at most 2% and wherein the stretch ratio in the longitudinal and in the transverse direction lies in the range from 1.2 to 3, the stress-strain diagram being measured at a temperature of 10° C. below the melting point of the polyethylene and the melting point being determined by differential scanning calorimetry using a heating rate of 10° C. per minute.

The films according to the invention can have one or more layers and are therefore monolayer films or multilayer films. They preferably have up to 9 layers. Some preferred films are described hereinbelow:

(i) Pure-Type, Single-Origin or Similar-Origin Films

The polymers contained in the films according to the invention are either pure type, single origin or similar origin in accordance with DIN EN ISO 11469. The polymers can be chosen from the group consisting of pure high-density polyethylene (HDPE), linear low-density polyethylene (LLDPE) and mixtures thereof. Particular preference is given to films according to the invention which comprise exclusively high-density polyethylenes (HDPE) or exclusively linear low-density polyethylene (LLDPE). Films containing exclusively polymers which are pure type or of single origin are very particularly suitable for recycling.

(ii) Films for Metallisation and Metallised Films

The films according to the invention can be metallised in order to improve the barrier properties and or the optical properties and or further properties of the films according to the invention. This is understood to mean applying a metal or metal oxide layer to the outside of at least one of the two outer layers of the film. In order to improve the adhesion of the metal or metal oxide layer, a layer having a high surface energy is preferably applied to the outer polyethylene layer. The layer can be chosen, for example, from the group consisting of polyamide layers, polyurethane layers, ethylene vinyl alcohol copolymer layers (EVOH), terpolymer layers with surface treatment, polyethylene terephthalate layers (PET), biaxially-oriented polypropylene layers with corona, plasma or flame surface treatment. Further suitable layers are known to the person skilled in the art. A metal or metal oxide layer is then applied to the layer having high surface energy. One example of a structure for such a film contains an outer layer of HDPE, a base layer of HDPE and a further outer layer having high surface energy, wherein the latter preferably contains polyurethane. In a further embodiment of this film, a layer containing an adhesion promoter is also inserted between the HDPE base layer and the outer layer having high surface energy. The adhesion promoter can be chosen from the group consisting of a polymer which contains maleic acid as monomer, chlorinated polyolefins (CPOs), acylated polyolefins (APOs), silane-adhesion promoters and organometallic adhesion promoters. The adhesion promoter is preferably a polymer which contains maleic acid as monomer. This is preferably an ethylene maleic acid copolymer.

(iii) Films with Additives

The films according to the invention can contain auxiliaries. The auxiliaries can be chosen from the group consisting of nucleating agents, in particular alpha-nucleating agents, anti-blocking agents, adhesion promoters, dispersants, stabilisers, lubricants, antistats, solid plasticisers, activators, promoters, anti-aging agents, means for preventing burn marks, binders, heat-resistant media, initiators, polymerisation catalysts, emulsifiers, plasticisers, heat stabilisers, light stabilisers, flame retardants, mould release agents, modifiers, clarifiers and antifogging agents. Dispersants enable films having a high content of filler (for example antiblocking agent) to be stretched and lead to a smooth surface. If these auxiliaries are present, the film according to the invention preferably contains auxiliaries in an amount of less than 5% by weight, based on the total mass of the film. A film according to the invention particularly preferably contains less than 3% by weight auxiliaries. The auxiliaries are preferably present at least in an amount of 0.1% by weight and more preferably in an amount of 1% by weight. If the film contains extenders, these are preferably chosen from the group consisting of polyethylene waxes and polypropylene waxes. Polypropylene waxes are preferred. Commercially available polyethylene waxes and polypropylene waxes of the Licocene® type from the company Clariant based in Frankfurt am Main, Germany, are suitable, for example.

One exemplary embodiment of such a film is a film having a three-layer structure with two outer layers which contain HDPE and one inner base layer which contains HDPE. The three layers preferably contain exclusively HDPE as polymer. The polymers contained in these films are therefore of pure type or single origin and the films can therefore be easily recycled. One or more of these layers can, as described above, be provided with auxiliaries.

(iv) Coloured Films

The films according to the invention can also contain dyes. This enables the films to be individualised for particular applications and to be adapted to particular requirements. They can be white films, for example, which have the advantage that primer for printing can be saved on. The films can also have different printing zones. This also leads to ink being saved when printing the films. In addition, such films are usually more readily recyclable than correspondingly printed films. A monolayer polyethylene film which contains a colour masterbatch could be mentioned by way of exemplary structure. Furthermore a three-layer film, in which the three layers contain HDPE or LLDPE (preferably HDPE) and one or both outer layers contain a masterbatch. The preferred ink is white.

(v) Opaque Films

These are films according to the invention in which at least one layer is provided with cavities (cavitated). Such films are ideally suited to Form Fill Seal (FFS) machines since they have a soft texture. Furthermore, these films according to the invention exhibit high gloss, low water permeability, reduced weight, can be printed directly and can be produced using less polyethylene. The cavities can be produced by adding particles (cavitating agents). These particles can, for example, contain materials which are chosen from the group consisting of calcium carbonate, polybutylene terephthalate, polymethyl methacrylate, nylon 6 and mixtures of such materials. The particles preferably consist of such materials. This layer preferably contains calcium carbonate particles. The particles can be present in an amount of up to 5% by weight in the films according to the invention, based on the total mass of the film.

One embodiment suitable for this is a 5-layer structure having a base layer which contains HDPE and cavities. A layer which contains a blend of LLDPE and HDPE and a dye is present on each of the two surfaces of the base layer. An outer layer of LLDPE, which can likewise contain a dye, is present on the outer surface of each of these layers. The layers containing the blend of HDPE and LLDPE serve as adhesion promoter between the outer layer which contains LLDPE and the base layer which contains HDPE. The dye is preferably white in all layers. Because of the LLDPE outer layers, such a film can be sealed without having to make any further changes to it.

(vi) Films Having Reduced Density

These are also films according to the invention in which at least one layer is provided with cavities (cavitated). Such films are ideally suited to Form Fill Seal (FFS) machines. The weight of the films is reduced compared to films having the same dimensions but without cavities. This results in savings on materials and hence lower costs. One exemplary structure of such a film consists of a HDPE base layer which contains cavities and, depending on the desired density of the film, 5 to 25% by weight of particles (cavitating agents), based on the total mass of the base layer, with the particles not being included in the calculation of the total mass of the film in this embodiment. The materials can be selected from the preceding list. A layer of HDPE can be applied to both sides of this base layer. Such films exhibit low water permeability and can be printed directly.

(vii) Films Comprising Layers Containing Ethyl Vinyl Alcohol Copolymers and/or Polyamides These films contain one or more layers containing a polymer chosen from the group consisting of ethyl vinyl alcohol copolymers (EVOH), polyamides and mixtures thereof. The polyamides can be polyurethanes. The advantages of such films are a better barrier effect against the diffusion of water and oxygen. In addition, the puncture resistance is improved.

One given example of such a film is a 7-layer film having a HDPE base layer on one side of which a layer is applied which contains an adhesion promoter, on top of which in turn a layer is applied which contains ethyl vinyl alcohol copolymers, polyamides or mixtures thereof. On top of this layer, a layer containing an adhesion promoter is again applied, on top of which an outer layer of the film is finally applied, containing LLDPE. On the other side of the base layer, a layer containing a blend of HDPE and LLDPE is applied, on top of which in turn an outer layer of the film is applied, containing LLDPE.

(viii) Heat-Sealable Films Preparable by Co-Extrusion

These films have a base layer which makes up at least 70% by weight based on the total mass of the film, preferably at least 80% by weight and most preferably at least 85% by weight. This base layer contains HDPE, preferably at least 80% by weight, particularly preferably at least 90% by weight and very particularly preferably at least 95% by weight HDPE. This base layer consists most preferably of HDPE. A layer of a blend containing HDPE and LLDPE is applied on at least one side of this base layer. On top of this layer, an outer layer of the film is applied, containing LLDPE. Such a film thus contains at least three layers. The outer layer makes the film heat-sealable. The layer containing the above-described blend serves as an adhesion promoter between the base layer and the outer layer. The layer containing the blend and the outer layer containing LLDPE can also be applied to both sides of the base layer. The film then contains five layers.

Such films have the advantage that they can be sealed without further changes and are compatible with Form Fill Seal (FFS) machines. Compared to films which only have one HDPE layer, it is not necessary to perform a lamination step here to make the films heat-sealable. The films can furthermore be produced simply and in one process step by co-extrusion.

(ix) Films With Outer Layers Containing Polyolefins Other Than Polyethylene

Films containing a proportion of polyolefins are still recognised as being single origin in many recycling systems. At the same time, polyolefins which differ from polyethylene increase thermal stability or can impart other properties to the films. Such films can by way of example be constructed as follows. On top of one side of a polyethylene base layer, a layer is applied which contains a blend of polyethylene and a copolymer made of at least two different olefins. On top of this layer containing the blend, an outer layer of the film is applied which contains a copolymer made of at least two different olefins. This is preferably the same copolymer which was used in the layer containing the blend. Any polymer which imparts the desired properties to the film can be used as copolymer. It can also be a terpolymer, in particular. The copolymers preferably contain at least one monomer chosen from the group consisting of ethylene, propene, 1-butene, 1-hexene, 1-octene and 1-decene. The copolymers preferably contain exclusively monomers chosen from this group. However, the copolymers can also contain other monomers in amounts of up to 5% by weight. These other monomers are preferably chosen from the group consisting of acrylic acid, acrylic acid ester, methacrylic acid, methacrylic acid ester, acrylonitrile, butadiene, styrene and maleic acid.

The other side of the base layer can either be the outer side of the film or the same layer structure can be applied to both sides. However, on the other side of the base layer, a layer containing a blend of HDPE and LLDPE is preferably applied, on top of which in turn an outer layer of LLDPE is applied. Such a film is additionally heat-sealable, which is ideal for packaging purposes.

(x) HDPE-LLDPE Blends

Both HDPE and LLDPE are particularly preferable for use in the films according to the invention. Their combined use in a film allows various properties of the film to be adjusted by changing the amounts of HDPE and LLDPE. A higher proportion of HDPE leads to improved mechanical properties such as modulus of elasticity and shrinkage. A higher proportion of LLDPE leads to better properties such as optics, puncture resistance and crack resistance. At the same time, using blends can improve the adhesion of HDPE and LLDPE to one another, which leads to a better adhesive bond between the layers when HDPE layers and LLDPE layers are used in a film.

These films have a base layer containing HDPE. A layer of a blend containing HDPE and LLDPE is applied on at least one side of this base layer. On top of this layer, an outer layer of the film is applied, containing LLDPE. Such a film thus contains at least three layers. The LLDPE outer layer can be made heat-sealable. The layer containing the above-described blend serves as an adhesion promoter between the base layer and the outer layer. The layer containing the blend and the outer layer containing LLDPE can also be applied to both sides of the base layer. This is then preferably a five-layer film. This is particularly preferred.

(xi) Coated Film

This is a film of which at least one outer layer has been coated with a material. Coating is to be understood in this sense as meaning that the coating has not been produced during extrusion of the film. The coating can be applied during the film's production process following extrusion and cooling of the melt or it can be applied to the finished film in a separate process. For example, the coating can be applied by top coating or inline coating. Such coatings usually require very little material and can be very thin. The coated films are therefore usually still well suited to recycling. The coating can serve to impart various properties to the film; for example, the barrier properties to water and oxygen can be considerably improved. It thus becomes possible to produce a recyclable film which has good barrier properties. Polyolefins are not generally used as the material for the coating. Polyurethanes can be used, for example.

One example that is given of a suitable film structure is a film having a base layer containing HDPE on top of which, at least on one side, an adhesion promoter (for example, Admer from the company Mitsui) is applied, on top of which in turn the coating is applied. Preferably, both of the base layer surfaces are still covered by a further layer containing HDPE. The adhesion promoter and the coating are then applied to at least one surface of these layers. This five-layer film is preferred. However, adhesion promoter and coating can also be applied to the surfaces of both HDPE layers which have been applied to the base layer.

(xii) Laminates

Films have various desired properties that are difficult or impossible to obtain by extrusion. For this purpose, the films according to the invention can also be processed further by lamination to give further films according to the invention. Such laminates can be produced by adhesive lamination, extrusion lamination, hot-roll lamination and other processes known to the person skilled in the art. These laminates contain at least 75% by weight and preferably at least 95% by weight of the films according to the invention as layers and correspondingly less than 25% by weight, preferably less than 5% by weight of layers containing other materials. The other laminated layers can be, for example, an LDPE blown film that allows the laminated film to be sealed. These laminates can furthermore contain 5% by weight of materials other than polyolefins and in particular other than polyethylenes. Such materials can be used in particular to obtain a film that is easy to thermoform. These materials can be polymers chosen from the group consisting of polyamides, ethylene vinyl alcohol copolymers (EVOH), polypropylene (PP), polyvinyl chloride (PVC), polystyrene (PS) and acrylonitrile-butadiene-styrene copolymers (ABS). Such polymers can be used, for example, to modify the barrier properties or the surface properties of the films according to the invention. However, the laminates according to the invention have to contain at least 75% by weight of biaxially-oriented polymers. This facilitates thermoforming.

Such a film can be, for example, a base layer consisting of biaxially-oriented HDPE onto which a (non-oriented) LLDPE blown film has been laminated. Such a film can be used to achieve hermetic sealing following thermoforming.

(xiii) Laminates of Various Films According to the Invention

The films according to the invention and in particular the films according to the invention cited under points (i) to (vii) can also be laminated to one another. This makes it possible to combine various properties which are not imparted to a film by an extrusion process.

Such a film can be, for example, a base layer consisting of biaxially-oriented HDPE onto which a likewise biaxially-oriented LLDPE film has been laminated. Such a film can also be used to achieve hermetic sealing following thermoforming.

The formulations "HDPE film", "LLDPE film", "HDPE layer", "LLDPE layer" and the like each describe films or layers that contain or consist of the cited polymers. In all of the above-described cases (i) to (xiii), each time that it is described that a layer contains a certain polymer (for example, HDPE, LLDPE, EVOH, PA, etc.), it is also the case that the layer consists of this polymer, unless stated otherwise. Unless stated otherwise, this is also the preferred embodiment for all films according to the invention.

Process for Producing BOPE

A further subject of the present invention is a process for producing a film according to the invention, comprising the following steps:
    extruding a film comprising at least one layer comprising polyethylene composed of at least one polymer melt,
    cooling the film to form a film,
    stretching the film in the longitudinal direction and in the transverse direction, wherein the stretch ratio in the longitudinal direction lies in the range from 1.2 to 9 and the stretch ratio in the transverse direction also lies in the range from 1.2 to 9.

The process is described in more detail below:

(1) Formulation & Dosage

The raw material used to produce the films according to the invention can either be provided as is or it can be produced by mixing several ingredients in an extruder or mixer during the production of the film. Plastic granules are preferably used as raw material. If the film has several layers, a separate raw material can be provided for each layer. Depending on the thickness desired for each layer, the raw material is metered separately for each layer.

For the polyethylene used in this process, what has been said above for the film according to the invention is applicable. Preference is given to a process according to the invention which is characterised in that the polyethylene used has a density in the range from 0.89 to 0.98 g/cm$^3$. A density in the range from 0.91 to 0.97 is particularly preferred.

The polyethylene used in the process according to the invention further preferably has an MFI (190° C./2.16 kg) in the range from 0.3 to 8 g/10 min, particularly preferably in the range from 0.7 to 5 g/10 min, and very particularly preferably in the range from 0.7 to 3 g/10 min.

In the process according to the invention, the thickness of the cast film is preferably 300 to 5000 μm, particularly preferably 500 to 3000 μm.

(2) Extrusion

The raw material(s) or ingredients thereof are fed to an extruder. They are mixed and melted in the extruder. If the film only has one layer, only one extruder is required. If the film has several layers, a separate extruder is usually used for each layer. However, several layers can also be produced from the same plastic granules if two or more layers have the same composition. Then the material can be extruded for two or more of these layers from the same extruder. Furthermore, all layers can be extruded from one extruder if all layers have the same composition. Any type of extruder can be used. The extruder(s) is/are preferably chosen from the group consisting of single-screw extruders, cascade extruders and twin-screw extruders. However, it is also possible to use other mixing and processing equipment, such as, e.g., a buss kneader or a planetary roll extruder. The extruders are preferably operated at a temperature in the range from 180 to 280° C., particularly preferably at a temperature in the range from 200 to 260° C. and most preferably at a temperature in the range from 230 to 250° C.

(3) Die and Chill Roll

The melt is discharged via a flat-film die and deposited on a chill roll. If the film has several layers, a multilayer die is preferably used. A device for applying the film to the chill roll (pinning system) is preferably used so as to improve the application of the film to the chill roll. A preferred device is an air knife, i.e. a directed air stream, which exerts a force on the film in the direction of the chill roll. A pinning system results in more uniform contact between the film and the chill roll and thus in the formation of a smooth and flat cast film.

The temperature of the chill roll is preferably in the range from 20 to 100° C. If the layer applied to the chill roll contains a high proportion of HDPE, the temperature of the film should preferably be adjusted to higher temperatures in this range. If the layer applied to the chill roll contains more than 60% by weight HDPE, the temperature of the chill roll is preferably in a range from 60 to 100° C., particularly preferably in a range from 70 to 100° C. and very particularly preferably in a range from 75 to 90° C. If the layer applied to the chill roll is easier to apply to the chill roll than layers containing HDPE (for example LLDPE), the temperature of the chill roll can thus be lower. If there is a high proportion of LLDPE in the single layer of the film or in the layer of the film applied to the chill roll, the temperature of the film should preferably be adjusted to lower temperatures in this range. If this layer contains more than 60% by weight LLDPE, the temperature of the chill roll is preferably in a range from 20 to 50° C., particularly preferably in a range from 25 to 45° C. and very particularly preferably in a range from 30 to 40° C.

For more effective cooling, the film can additionally be conducted through a cooling bath. The cooling bath is preferably installed in the region of the chill roll. The cooling bath is preferably a water bath. If a water bath is additionally used for the cooling, the chill roll can be mounted so as to rotate in a water bath, wherein typically more than half of the chill roll is submerged into the water bath. By way of example, an appropriate chill roll is known from DE 197 05 796 C2. The chill roll can also be cooled from the inside as well.

(4) Stretching

The cast film thus produced is then stretched in the longitudinal direction (machine direction, MD) and in the transverse direction (TD). In the process according to the invention, the stretch ratio in the longitudinal direction and in the transverse direction preferably lies in the range from 1.2 to 5.5. The films obtained by such a process allow shaped bodies having simple shapes to be produced, such as are also possible using biaxially-oriented polystyrene, from the films according to the invention, without the films tearing during thermoforming or resulting in a very irregular thickness distribution. The stretch ratio in the process according to the invention is preferably in the range from 1.2 to 5.0. Very particularly preferably, the stretch ratio in the process according to the invention is in the range from 1.2 to 3. Most preferably, the stretch ratio in the process according to the invention is in the range from 1.2 to 2. These figures apply both to the longitudinal and the transverse direction. Films produced using such a stretch ratio also allow shaped bodies having complicated shapes to be produced by thermoforming. Such shaped bodies are to date not accessible from biaxially-oriented polystyrene, for example.

Using the films stretched according to the invention, problems can occur at critical points (uniformity of thickness at corners, edges, etc.) during the thermoforming, as can also be observed in the thermoforming process with other biaxially-oriented films such as, for example, films made of biaxially-oriented polystyrene or biaxially-oriented polypropylene. The lower the stretch ratio in the process for producing the films according to the invention, the better the critical points can be shaped in the thermoforming process. The aim is therefore for the stretch ratio to be as low as possible in the process according to the invention with simultaneously high rigidity, uniformity of thickness and low shrinkage.

The biaxial orientation or stretching can be performed both sequentially and simultaneously. Processes for sequential and simultaneous biaxial orientation and stretching are known to the person skilled in the art. One process is described in published patent application DE 10 2019 119293 A1, in particular in paragraphs [0045] to [0055]. The method described here is preferably correspondingly used for the present invention.

(5) Sequential Stretching a) Stretching in the Longitudinal Direction

Sequential stretching is preferably performed as follows. The cast film produced as described above is fed to a longitudinal stretching device and stretched in the machine direction following sufficient heating. As specified above, stretching in the machine direction can have a stretch ratio of 1.2 to 9. The film is normally stretched between pairs of rollers having different rotational speeds. The temperature of the film in the longitudinal stretching machine is preferably in the range from 30 to 140° C., particularly preferably in the range from 80 to 120° C. The speed of the film during stretching in the longitudinal direction is up to 600 m/min in this case.

b) Stretching in the Transverse Direction

Stretching in the transverse direction preferably takes place after stretching in the longitudinal direction. For stretching in the transverse direction, the film is fed to a transverse stretching device. As specified above, the film is stretched in the transverse direction with a stretch ratio of 1.2 to 9.

In this process, the film is first preheated. The temperature in the case of transverse stretching is preferably in a range from 50 to 180° C., particularly preferably in a range from 100 to 150° C. After the film, which has already been stretched in the longitudinal direction, has entered the transverse stretching device, it is gripped at the sides by holding clips guided on rails. By moving the holding clips on opposite sides of the film in the opposite direction, the film is stretched in the transverse direction.

(6) Simultaneous Stretching

The films according to the invention can also be stretched in a simultaneous elongation process. Simultaneous stretching can be carried out by a method chosen from the group consisting of pantograph method, spindle method, LISIM method and MESIM method. The temperature during simultaneous stretching is preferably in the range from 50 to 180° C., particularly preferably in the range from 80 to 150° C. The film speed in this case is preferably 600 m/min or less.

(7) Heat Treatment

The film is preferably subjected to a heat treatment (also called stabilisation or annealing) following stretching. For this purpose, the film is held at elevated temperature for a certain time. This is preferably done straight after the stretching. In sequential stretching, the heat treatment is preferably carried out directly after the last stretch. During the heat treatment, stresses within the film that have arisen due to the stretching are dissipated. This makes the properties over the entire surface of the film uniform.

(8) Relaxation

The film is preferably relaxed during the heat treatment. This means that the stress exerted by the stretching apparatus on the film is reduced. As a result, the film can contract again. This procedure reduces the stresses within the film. Relaxation can take place in the longitudinal direction, in the transverse direction or in both directions. Relaxation is preferably carried out in both directions.

It is furthermore advantageous if the extent of the relaxation in the process according to the invention is in the range from 2% to 12%, preferably in the range from 5% to 10%. This preferably applies to relaxation in both directions. The relaxation reduces the shrinkage of the film and the shrinkage of the shaped body produced from such a film.

Accordingly, a process according to the invention is particularly preferred in which the following process step follows the stretching:
  carrying out a heat treatment, wherein, during the heat treatment, relaxation is carried out in the longitudinal direction and in the transverse direction.

Stretching the film and carrying out a heat treatment (annealing) with relaxation can result in its shrinkage being reduced.

(9) Inline Coating

In the process according to the invention, the film can be coated during the stretching. This is preferably done using inline coating technology (ILC). Here, a coating is preferably applied to at least one outer layer of the film during the sequential stretching between the stretching in the longitudinal direction and the stretching in the transverse direction. This can be done, for example, by applying (in particular by printing) an aqueous polyurethane suspension to the film surface. When heated prior to stretching in the transverse direction, the solvent of the suspension is then evaporated off and the coating is shaped.

(10) Further Treatment

The biaxially-oriented film thus produced according to the present invention can be treated further by the following steps. The film can subsequently be cut. This is preferably effected at the edges so as to make the latter smooth. The thickness profile of the film can be measured. If desired, the film can optionally be surface-treated. Finally, the film is wound onto a winder. Furthermore, the film can be finished to give slit rolls. Further possible treatment steps include metallisation, lamination, cladding, coating (barrier, protection), printing, slitting, surface treatment, laser processing, painting, etc.

Use

A further subject of the present invention is the use of the film according to the invention for thermoforming.

Process for Thermoforming

A further subject of the present invention is a process for producing a shaped body, characterised in that a film according to the invention is deformed by thermoforming.

The process is preferably carried out in such a way that a process according to the invention for producing the film according to the invention is carried out and the film thus obtained is deformed by thermoforming.

Furthermore, the process according to the invention for producing a shaped body according to the present invention is preferably characterised in that the film is formed with a degree of deformation in the range from 2 to 6.

Different shaped bodies can be formed using tools that are standard in thermoforming (e.g., male/female moulds, with an ILLIG forming and punching tool, or HYTAC-WFT as plug-assist (epoxy resin with hollow glass spheres and Teflon, mould air reduction, directly cooled blank holder and with lateral mould air valves)). For shaped bodies that are difficult to form, edges, small radii etc., of the moulds must be specially designed, as is customary in thermoforming. For example, it is possible to use heat-treated tools.

Preferably, in the process according to the invention for thermoforming films, a film is first heated until it becomes rubber-elastic and is then deformed into a three-dimensional shaped body. The temperature at which the film assumes a rubber-elastic state is highly dependent on the film that is used. In particular, the temperature required depends on the material of the film. The film according to the invention is preferably heated in this process to a temperature in the range from 70 to 150° C., particularly preferably to a temperature in the range from 100 to 140° C. and most preferably in the range from 120 to 130° C.

The deformation is preferably effected via mechanical or pneumatic deformation. In pneumatic deformation, a different gas pressure is applied to the opposite surfaces of the film. These processes are well known to the person skilled in the art. The thermoforming process can be completed in one step. In this case, the thermoforming process is preferably carried out by a process chosen from the group consisting of vacuum thermoforming, drape thermoforming, billow thermoforming, autoclave thermoforming and diaphragm thermoforming. Alternatively, a multi-step process can be used for thermoforming. This is expedient if specific wall thicknesses are to be achieved at specific points on the mould. Pressure forming is preferred as 2-step process. The films according to the invention can be processed into different applications by the thermoforming process using thermoforming machines and suitable semi-finished products.

Polyethylene Mouldings

A further subject of the present invention is a shaped body formed fully or partly by thermoforming from a biaxially-oriented film, characterised in that it comprises at least 75 wt. % polyethylene and at least 95 wt. % polyolefins, based on the total mass of the shaped body.

Such mouldings can for example be used in products chosen from the group consisting of trays, coffee pods, blister packs, refrigerator cladding, cryogenic packaging, plastic cups and in particular yoghurt pots, packaging for, e.g., fruit, vegetables, meat or other foodstuffs. Preference is given to a shaped body according to the invention, characterised in that the film is a film according to the invention. The film according to the invention is particularly suitable in all of its embodiments for producing shaped bodies.

Likewise preferred is a shaped body according to the invention which is characterised in that in the part of the shaped body that was formed by thermoforming, the ratio of the greatest thickness of the formed film to the smallest thickness of the formed film is not more than two.

Likewise preferred is a shaped body according to the invention which is characterised in that the water permeability (ASTM E 96) is not more than 8 g/m²/day (at 30° C. and 90% relative humidity) and particularly preferably is not more than 5 g/(m²*day). Moreover, preference is given to a shaped body according to the invention which is characterised in that the oxygen permeability (ISO 15105-2) is not more than 4000 cm³/m²/day (at 23° C. and 0% relative humidity), particularly preferably is not more than 2700 cm³/m²/day. The films according to the invention contain a large proportion of polyethylene or consist thereof. Polyethylene films already have favourable barrier properties in respect of water and oxygen. Stretching the film further improves these properties. The films in the present case have very low 2-sigma thickness distribution values. Shaped bodies produced from these films therefore have only a low number of weak points and thin-walled parts. This likewise leads to improved barrier properties for the shaped bodies. These properties can be improved further by applying layers with good barrier barriers to the films according to the invention, as described herein.

LIST OF ABBREVIATIONS

Figure 1:
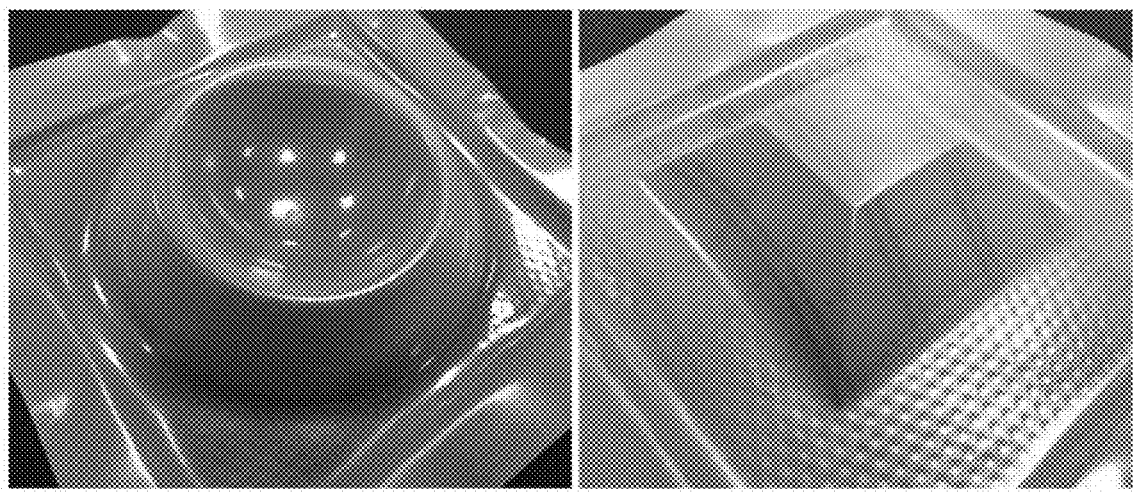
FIGS. 1 and 2 show shaped bodies according to the invention which have been produced from films according to the invention.

ABS acrylonitrile-butadiene-styrene copolymer
BO biaxially-oriented
BOPE biaxially-oriented polyethylene
BOPP biaxially-oriented polypropylene
BOPS biaxially-oriented polystyrene
CPP cast polypropylene (cast PP)
Cast PET cast polyethylene terephthalate
EVOH ethyl vinyl alcohol copolymers HDPE high-density polyethylene
LLDPE linear low-density polyethylene
MDPE medium-density polyethylene
MD longitudinal direction, machine direction
PA polyamide
PE polyethylene
PET polyethylene terephthalate
PP polypropylene
PS polystyrene
PU polyurethane
PVC polyvinyl chloride
TD transverse direction, transverse to the machine direction

EXAMPLES

Measurement Methods

Film thicknesses: DIN 53370; layer thicknesses: DIN EN ISO 3146; tensile strength: ASTM D 882; elongation at break: ASTM D 882; modulus of elasticity: ASTM D 882; coefficient of friction: DIN EN ISO 8295, U/U; heat shrinkage: BMS TT 0.9; 100° C./5 min and BMS TT 0.2; 120° C./5 min; coefficient of friction: DIN EN ISO 8295; haze: ASTM 1003; gloss: ASTM 2457; corona treatment: ASTM 2457; puncture resistance: DIN EN 14477 (1.0 mm rounded-tip pen); oxygen permeability ISO 15105-2; at 23° C. and 0% relative humidity; water permeability: ASTM E 96, at 30° C. and 90% relative humidity.

Example 1

Production of a Film According to the Invention

A three-layer film was produced. High-density polyethylene (HDPE) having a density of 0.953 g/cm$^3$ and an MFI of 0.9 g/10 min (190° C.; 16 kg), which was produced by suspension polymerisation with a Ziegler-Natta catalyst ("Hostalen GD 9555" from LyondellBasell) was added to three extruders. A twin-screw extruder having a vacuum and a 200-μm filter was used as main extruder for the middle layer (base layer), which extruder was operated at a temperature of 200 to 260° C. in all zones. A single-screw extruder having a 200-μm filter and no vacuum was used as co-extruder for each of the two outer layers, which extruder was operated at a temperature of 230 to 250° C. in all zones. A 3-layer die was used as extrusion die. The melts were extruded through the die and applied to a chill roll. A standard high-pressure air knife was used to assist in pressing the film against the chill roll. The temperature of the chill roll was 70-100° C. The surface speed of the chill roll was 2 m/min. A water bath was not used. The film was then wound up.

The cast film was produced in a thickness of 1850 μm and a width of 35 cm. The middle layer makes up 80% of the film thickness, the other two layers each make up 10% of the film thickness. The modulus of elasticity of the cast film thus obtained was 609 MPa in the longitudinal direction.

The film was then stretched on a pilot plant. A 90×90 mm square was cut from the centre of the film. This was clamped in the pilot plant. Stretching was effected by simultaneous stretching in the longitudinal and transverse directions. The temperature during stretching was 125° C. for all tests. The pre-heating time was 300 seconds. Degree of stretch and the extent of relaxation for the various films according to the invention that have been produced are shown in Table 1 below. The films were stretched in the longitudinal and transverse directions at the same speed and with the same degree of stretch. The stretching lasted two seconds. Heat treatment was carried out on some of the films produced (see Table 1). This took place at 125° C. for five seconds. The films were then relaxed. The extent of relaxation is shown in Table 1. The speed was 12% relaxation per second. Seven films according to the invention were manufactured.

TABLE 1

| Film No. | 1 | 2 | 3 | 4 | 5 | 6 | 7 |
|---|---|---|---|---|---|---|---|
| Degree of stretch MD × TD | 3 × 3 | 3 × 3 | 3.5 × 3.5* | 3.5 × 3.5** | 4 × 4 | 6 × 6 | 6 × 6 |
| Heat treatment | Yes | Yes | Yes | Yes | Yes | No | Yes |
| Relaxation [%] | 15 | 10 | 8 | 8 | — | — | — |
| Tensile strength MD [MPa] | 55 | 68 | 73 | 88 | 81 | 135 | 123 |
| Elongation at break [%] | 456 | 310 | 289 | 245 | 251 | 80 | 134 |
| Modulus of elasticity [MPa] | 1264 | 1212 | 1203 | 1209 | 1171 | 1523 | 1247 |
| Film thickness [μm] | 210 | 210 | 152 | 150 | 120 | 55 | 55 |

*Stretching speed 50% to 100% per second
**Stretching speed greater than 100% per second As can be seen, the modulus of elasticity is approximately doubled by the stretching.

Example 2

Production of Shaped Bodies

Shaped bodies were produced from Film 1 of Example 1 by thermoforming. For this purpose, the film was heated to 125° C. and shaped bodies were formed therefrom in a thermoforming machine. The thermoforming was carried out by vacuum thermoforming at a temperature of 125° C. The plugging speed was 200 mm/s, the plug-assist material was HYTAC-WFT (epoxy resin with hollow glass spheres and Teflon).

FIG. 1 shows two shaped bodies produced in this way. As can be seen, these have a regular shape. The round mould has a diameter of 150 mm and a height of 20 mm at the upper vertex. The film thickness in the centre of the shaped body is 100 μm. The film thicknesses of the square moulds are in the range from 190 to 210 μm. Therefore, stretching is uniform, and the shaped bodies formed are strong enough to be able to be used as packaging materials. It can also be seen on the grid of the square shaped body that the stretching is very uniform and without large irregularities. This leads to very regular wall thicknesses of the shaped bodies, which is a prerequisite for their dimensional stability and their barrier effect. The water permeability is less than 6 g/m²/day and the oxygen permeability is less than 3500 cm³/m²/day.

Figure 2:
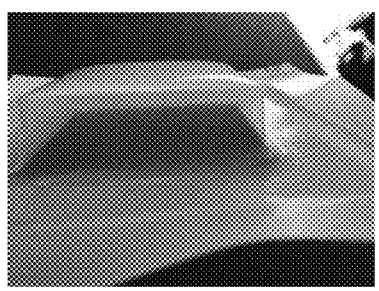
Figure 3:
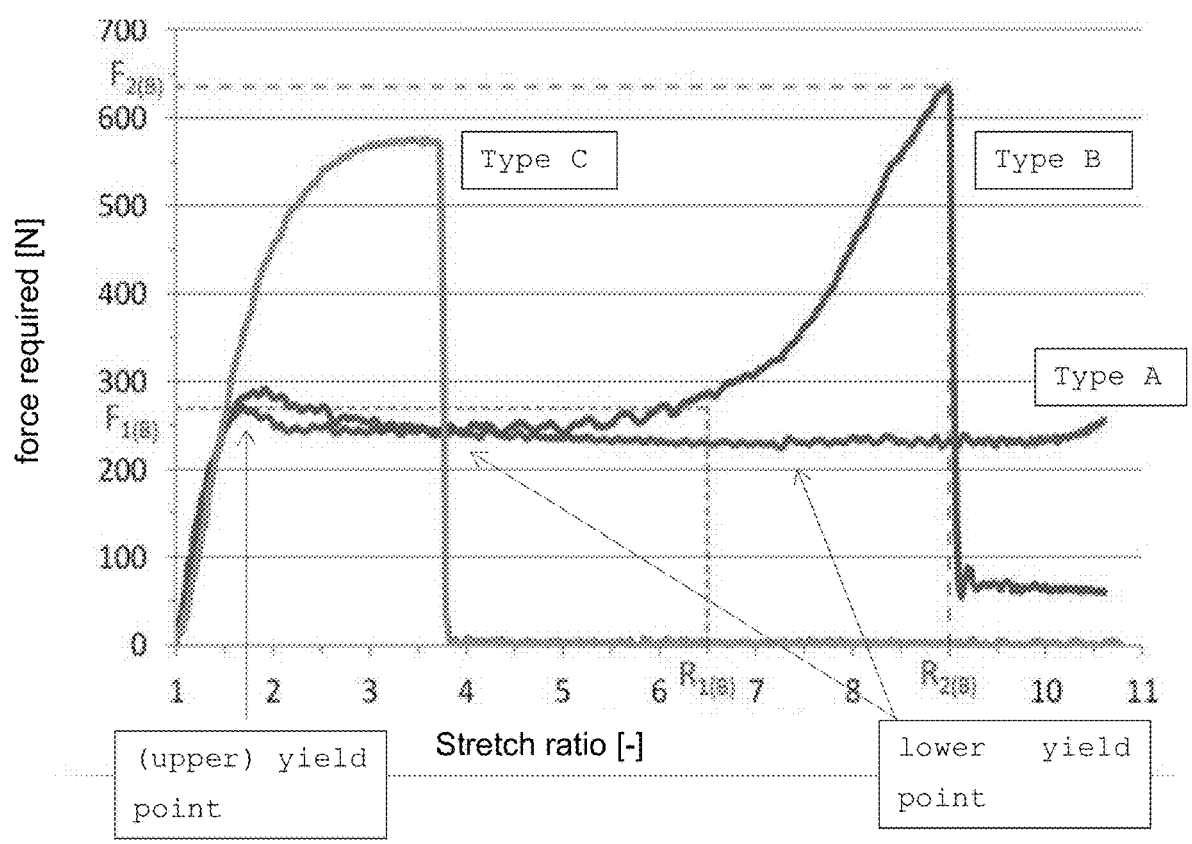
FIG. 3 shows the stress-strain diagrams of three different polyethylenes.

FIG. 2 shows a shaped body where the side walls are perpendicular to the original plane of the film. The deformation (the stretching) is very high at the side walls in such a mould. The mould could nevertheless be produced successfully. The side walls have a film thickness of 120 μm and the base (or lid) in the centre of the moulding has a film thickness of 210 μm. The side walls are noticeably more transparent than the base of the moulding.

Example 3

Production of a Film According to the Invention

Material, layer construction and layer thickness of the cast film correspond to the details in Example 1. A BT-55-32D double-vacuum main extruder with a 400-μm filter is used as the extruder for the middle base layer. The temperature of the extruded melt was 258° C. A BT-43-30D single-vacuum co-extruder with a 200-μm filter was used for each of the two outer layers at a temperature of 263° C. An EDI 3-layer die was used. The chill roll had a temperature of 80° C. and a high-pressure air knife was used to assist with the application of the film to the chill roll. A water bath was not used.

The film thus produced was biaxially stretched in a simultaneous process. The film first passes through 3 pre-heating zones in the stretching oven that have temperatures in the range from 136 to 144° C. The film then passes through 2 stretching zones that have temperatures in the range from 116 to 130. This is followed by 2 further-heating zones in which heat treatment is effected. These further-heating zones are operated at a temperature of 105 to 110° C. Finally, the film passes through a cooling zone having a temperature of 80° C.

The film thus produced has a thickness of 51.99 μm and a 2-sigma film thickness value of 8.32%. The 2-sigma value is important for the film according to the invention because films having a large variation in thickness result in defective products during thermoforming. If parts of the film that are very thin are located in places that are highly mechanically stressed during the thermoforming, the thermoforming products will leak and/or have mechanical weak points that impair their properties.

A total of 3 films were produced. The following table gives further data about this test.

TABLE 2

| | | | | Film No. | |
|---|---|---|---|---|---|
| Properties | | Unit | 8 | 9 | 10 |
| Degree of stretch MD × TD | | | 3.2 × 2.9 | 4.2 × 3.8 | 5 × 4.2 |
| Thickness - nominal value | | μm | 52.0 | 30.0 | 25.0 |
| Thickness | MD centre | μm | 51.99 | 30.47 | 24.54 |
| | TD | μm | 54.21 | 31.27 | 25.16 |
| Tensile strength | MD | MPa | 76 | 116 | 130 |
| | TD | MPa | 122 | 144 | 149 |
| Elogation at break | MD | % | 330 | 192 | 152 |
| | TD | % | 242 | 148 | 131 |
| Modulus of elasticity | MD | MPa | 1340 | 1221 | 1296 |
| | TD | MPa | 1399 | 1178 | 1194 |
| Coefficient of friction | u/u* static | | 0.20 | 0.19 | 0.14 |
| | u/u sliding | | 0.21 | 0.20 | 0.16 |
| | u/d* static | | 0.26 | 0.22 | 0.18 |
| | u/d sliding | | 0.27 | 0.24 | 0.20 |
| | d/d static | | 0.19 | 0.21 | 0.19 |
| | d/d sliding | | 0.21 | 0.21 | 0.18 |
| Haze | | % | 20.60 | 10.70 | 8.09 |
| Gloss | 45° | | 40 | 65 | 72 |
| Heat shrinkage 100/5 | MD | % | 3.17 | 3.73 | 3.43 |
| | TD | % | 2.33 | 3.87 | 0.93 |
| Heat shrinkage 120/5 | MD | % | 12.50 | 14.67 | 14.20 |
| | TD | % | 13.67 | 16.43 | 12.83 |
| Puncture resistance (1.0 mm rounded-tip pen) | Force | N | 9.49 | 9.31 | 7.81 |
| | Force | g | 968.2 | 949.5 | 796.2 |
| | Force/area | N/mm | 175.4 | 280.8 | 311.8 |
| | Work until break | mJ | 10.35 | 8.31 | 6.44 |
| | Elongation at break | mm | 2.12 | 2.00 | 1.91 |

Remarks: Thickness, tensile strength, elongation at break, modulus of elasticity, haze and heat shrinkage were measured directly after production. All other measurements were made a day later. Abbreviations: u: up; d: down.

The invention claimed is:

1. A biaxially-oriented film for thermoforming, wherein the film contains at least 75% by weight polyethylene and at least 95% by weight polyolefins, based on the total mass of the film, wherein the polyethylene has an elongation at break of at least 7 in the stress-strain diagram, wherein the stress-strain diagram is measured at a temperature of 10° C. below the melting point of the polyethylene and the melting point is determined by differential scanning calorimetry using a heating rate of 10° C. per minute, wherein the stretch ratio in the longitudinal and in the transverse direction lies in the range from 1.2 to 5.5.

2. The film according to claim 1, wherein the stress-strain diagram of the polyethylene has an upper yield point and the yield stress is the highest stress in the stress-strain diagram.

3. The film according to claim 2, wherein the stress-strain diagram of the polyethylene additionally has a lower yield point and all stress values in the case of strain values higher than the strain at the lower yield point are lower than the mean value of the yield stress and the stress at the lower yield point.

4. The film according to claim 3, wherein the stress-strain diagram of the polyethylene exhibits no stress-strain hardening.

5. The film according to claim 1, wherein the polyethylene is a polyethylene chosen from the group consisting of HDPE, MDPE and LLDPE.

6. The film according to claim 1, wherein the modulus of elasticity of the film is at least 800 MPa.

7. The film according to claim 1, wherein the shrinkage of the film is at most 5% in the longitudinal direction and at most 5% in the transverse direction.

8. The film according to claim 1, wherein the film has a thickness in the range from 25 μm to 2000 μm.

9. The film according to claim 1, wherein the film has a 2-sigma thickness distribution value of 15% or less.

10. A process for producing the film according to claim 1, wherein the film is produced according to a process comprising the following steps:
    extruding a film comprising at least one layer comprising polyethylene composed of at least one polymer melt,
    cooling the film to form a film,
    elongating the film in the longitudinal direction and in the transverse direction, wherein the stretch ratio in the longitudinal and in the transverse direction lies in the range from 1.2 to 5.5,
    further comprising a heat treatment which is subsequently carried out, wherein during the heat treatment relaxation is performed in the longitudinal direction and in the transverse direction,
    wherein the extent of the relaxation is in the range from 2% to 12%.

11. The process according to claim 10, wherein the polyethylene used has a density in the range from 0.89-0.98 g/cm$^3$.

12. The process according to claim 10, wherein the polyethylene used has an MFI (190° C./2.16 kg) of 0.3-8 g/10 min.

13. A process for producing a shaped body, wherein a film is deformed by thermoforming, wherein the film is a biaxially-oriented film for thermoforming, wherein the film contains at least 75% by weight polyethylene and at least 95% by weight polyolefins, based on the total mass of the film, wherein the polyethylene has an elongation at break of at least 7 in the stress-stain diagram, wherein the stress-strain diagram is measured at a temperature of 10° C. below the melting point of the polyethylene and the melting point is determined by differential scanning calorimetry using a heating rate of 10° C. per minute.

14. The process according to claim 13, wherein the film is formed with a degree of deformation in the range from 2 to 6.

15. A shaped body formed fully or partly by thermoforming from a biaxially-oriented film, wherein the body comprises at least 75 wt. % polyethylene and at least 95 wt. % polyolefins, based on the total mass of the shaped body, wherein the film contains at least 75% by weight polyethylene and at least 95% by weight polyolefins, based on the total mass of the film, wherein the polyethylene has an elongation at break of at least 7 in the stress-strain diagram, wherein the stress-strain diagram is measured at a temperature of 10° C. below the melting point of the polyethylene and the melting point is determined by differential scanning calorimetry using a heating rate of 10° C. per minute.

16. The shaped body according to claim 15, wherein the part of the shaped body that was formed by thermoforming, the ratio of the greatest thickness of a formed film to the smallest thickness of the formed film is not more than two.

17. The shaped body according to claim 15, wherein the water permeability measured to ASTM E 96 at 30° C. and 90% relative humidity is not more than 8 g/m2/day.

18. The shaped body according to claim 15, wherein the oxygen permeability measured to ISO 15105-2 at 23° C. and 0% relative humidity is not more than 4000 cm3/m2/day.

* * * * *